July 1, 1924.
F. LOBL
NAIL CLIPPER
Filed March 22, 1922
1,499,673
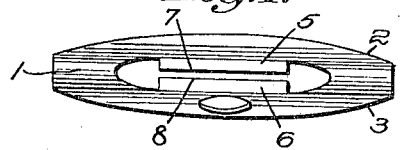
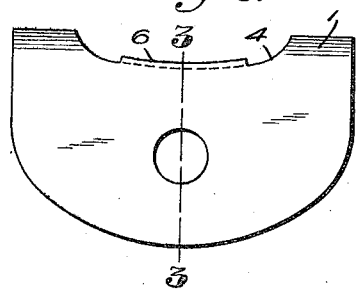
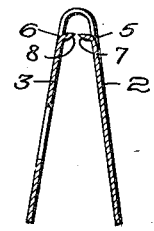
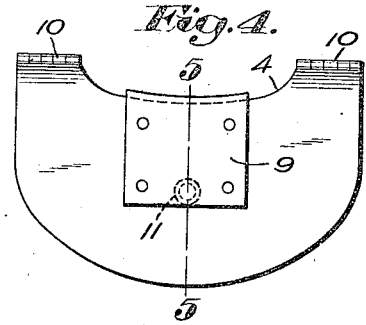
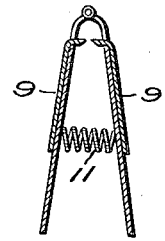
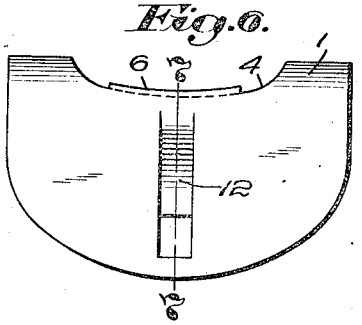
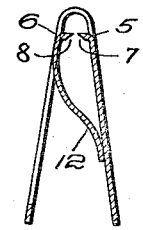
Inventor:
Frederick Lobl Patented July 1, 1924.

1,499,673

UNITED STATES PATENT OFFICE.

FREDERICK LOBL, OF MIDDLEBORO, MASSACHUSETTS.

NAIL CLIPPER.

Application filed March 22, 1922. Serial No. 545,835.

*To all whom it may concern:*

Be it known that I, FREDERICK LOBL, a citizen of the United States, and resident of Middleboro, county of Plymouth, and Commonwealth of Massachusetts, have invented an Improvement in Nail Clippers, of which the following description, in connection with the accompanying drawings, is a specification, like characters on the drawings representing like parts.

This invention relates to nail clippers and its object is to provide a novel device of that nature that may be carried conveniently in the pocket or pocketbook.

In the drawings of one embodiment of my invention illustrated and described herein, Fig. 1 is a front edge view;

Fig. 2, a plan;

Fig. 3, a vertical section on the line 3—3 Fig. 2.

Fig. 4, a plan of a modified form of construction;

Fig. 5, a vertical section on the line 5—5 Fig. 4.

Fig. 6, a plan of a further modification; and

Fig. 7, a vertical section on the line 7—7, Fig. 6.

Referring first to Figs. 1, 2, 3, my novel cutter comprises a sheet of suitable material as metal bent or folded along one edge 1 to form two wings, 2, 3, of any convenient size and outline. This metal is preferably of the resilient kind so that the wings may be pressed toward each other and will thus automatically separate and return to their original and normal positions.

To provide the required cutting members, Figs. 1, 2, the edge 1 is cut away, a portion of its length, and the central part of the recessed edge 4 on each wing, Fig. 1, is inwardly turned, tempered and sharpened forming the jaws 5, 6, with cutting edges 7, 8, thereon. Obviously by compressing the wings 2, 3, toward each other, the cutting edges 7, 8, will be caused to clip the nail end between them.

In Figs. 4, 5, a modification is disclosed wherein the jaws 5, 6, and cutting edges 7, 8, are formed from a piece of metal 9 riveted or otherwise secured to the wings 1, 2. This construction is convenient in cases where it is desired to make the wings 1, 2, of some metal as silver or gold that cannot readily be tempered to form the cutting edges 7, 8.

In this form of cutter also the two wings are formed of separate members which are hinged at 10 along their front edges adjacent the cutters 7, 8. A spring 11 may be provided if desired to separate the yarns.

In Figs. 6, 7, the wings are provided with a spring or resilient tongue member 12 struck up from one of the wings and caused to seat at one end against the opposite wing.

Obviously my invention is not restricted to the particular embodiment thereof herein illustrated, but is more particularly pointed out in the following claims:

Claims.

1. A nail clipper comprising a pair of wings having one common edge, a portion of the common edge being recessed and provided with cutting sections between but out of alignment with the connecting portions of the wings.

2. A nail clipper comprising a pair of wings having one common edge, a portion of the common edge being recessed and provided with cutting sections between but out of alignment with the connecting portions of the wings, and a spring for normally separating the wings.

3. A nail clipper comprising a lower wing, an upper wing integral therewith, and cutting edges on the wings between but out of alignment with the connecting portions of the wings.

4. A nail clipper comprising two opposed wings having one common edge, and a portion of this edge cut away to form opposed cutting edges between but without the vertical plane of the connecting portions of the wings.

5. A nail clipper comprising opposed but integral wings 2, 3, having the cutting edges 7, 8, between but without the vertical plane of the connecting portions of the wings, and the spring 12 between said wings.

In testimony whereof, I have signed my name to this specification.

FREDERICK LOBL.